Aug. 27, 1940.   W. J. JACOBSSON ET AL   2,213,043
BLOWPIPE
Filed Jan. 21, 1937    2 Sheets-Sheet 2

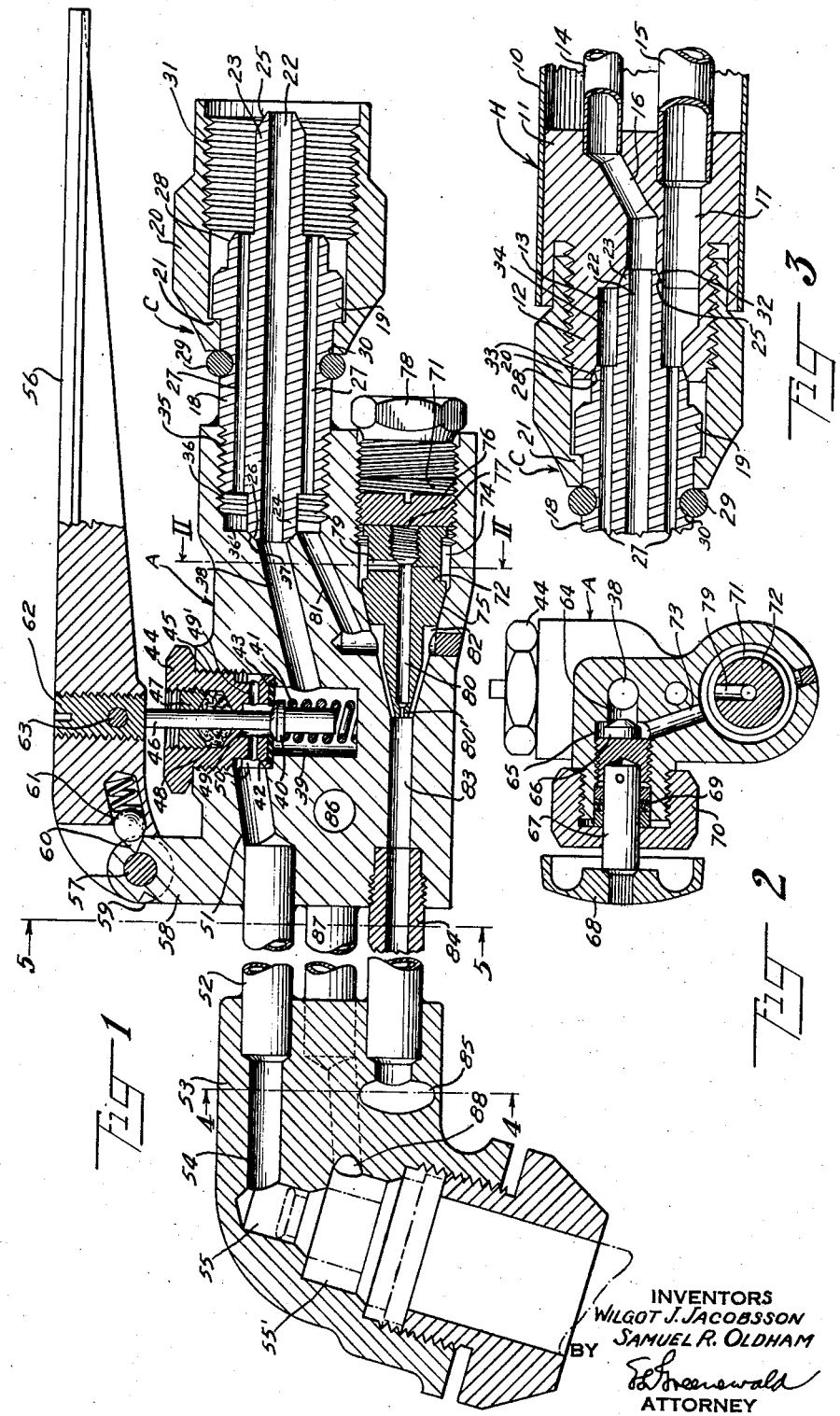

INVENTORS
WILGOT J. JACOBSSON
SAMUEL R. OLDHAM
BY
ATTORNEY

Patented Aug. 27, 1940

2,213,043

UNITED STATES PATENT OFFICE 2,213,043

BLOWPIPE

Wilgot J. Jacobsson, Scotch Plains, and Samuel R. Oldham, Elizabeth, N. J., assignors to Oxweld Acetylene Company, a corporation of West Virginia Application January 21, 1937, Serial No. 121,394

13 Claims. (Cl. 158—27.4)

This invention relates to a blowpipe, and more particularly to a blowpipe which is adapted to use either low or medium pressure fuel gas efficiently without danger of flashbacks; and to such a blowpipe which may be used as an attachment for existing blowpipes, especially for converting a conventional welding blowpipe into a cutting blowpipe.

Blowpipe apparatus is not inexpensive, and it is desirable to keep at a minimum the expense of such equipment for doing both welding and cutting work, particularly in small shops. Experiment has shown that a single blowpipe handle with the usual control valves thereon may be used, by means of interchangeable attachments, for both a welding and a cutting operation. To this end, the usual welding blowpipe is employed and, when it is desired to perform a cutting operation instead of a welding operation, the mixer, the stem and the connecting part or parts are removed from the front of the handle and a cutting attachment having appropriately fitting parts is connected to the forward end of the handle.

When the velocity of the stream of the combustible gas mixture issuing from the orifice of a blowpipe nozzle is low as compared with the rate of flame propagation, the flame will recede and travel into the combustible gas mixture passages. This phenomenon is known as a flashback, and when it occurs it is necessary to stop the metal working operation and extinguish the flame, thus causing a delay which may affect the results of the operation. Blowpipes may be constructed so that they will not flashback when used with fuel gas at one pressure, but if the pressure of the fuel gas is increased or decreased to any great extent, the resistance to flashback will be materially altered. This difficulty has made it necessary either to change blowpipes if the supplied acetylene pressure is changed, or at least to change the mixers or other parts of the blowpipe.

A study of the factors affecting flashback has revealed that the resistance to this phenomenon may be greatly improved by the following features of construction; greatly increasing the length of the passage between the point of mixing of the fuel gas and combustion-supporting gas and the nozzle orifice, thereby creating an increased backfire force to drive the component gases rearwardly back into their respective lines; providing abrupt changes or even reversals in the direction of flow of the gas mixture between the mixing point and the nozzle orifice, so as to interrupt any explosive waves that may occur; more accurately aligning the injector and hence improving the gas distribution; providing a gradually-tapering injector head; and by providing large acetylene and oxygen chambers around the injector with comparatively restricted feeding or gas flow to and from such chambers, so as to improve the distribution of acetylene and also produce an effective cushion in each gas line. The incorporation or inclusion of the above features of construction in a single blowpipe will improve the flashback resistance to such a great extent that the blowpipe may be efficiently operated with a comparatively wide range of fuel gas pressures.

Heretofore it has not been possible to use the same attachment with both low and medium pressure fuel gas without changing mixers or other parts when changing from gas at one pressure to gas at the other, and without sacrificing flashback resistance. Since either low pressure or medium pressure fuel gas may be available at the point where the cutting operation is to be performed, but not both, it is important that the same attachment be adapted for use as it stands with either pressure of fuel gas, not only as a matter of economy but also as a matter of convenience and time saving.

One object of the invention is, therefore, to save the expense of purchasing a complete welding blowpipe and a complete cutting blowpipe for performing the two operations, by providing a separate cutting attachment for use with the welding blowpipe. Another object is to provide a cutting attachment, or a complete cutting blowpipe, which will operate efficiently on either low pressure or medium pressure fuel gas without the necessity of changing mixers for fuel gas and combustion-supporting gas or other parts. A further object is the provision of a cutting gas valve of high capacity, in order to allow the use of low pressure cutting and combustion-supporting gas in the attachment. Other objects will become apparent upon consideration of the present specification.

In accordance with the invention there is provided a blowpipe having a cavity and an outlet for a combustible gas mixture at one end thereof, the internal wall of the cavity tapering toward the outlet. Disposed in the cavity is a mixing nozzle having a discharge end adjacent the outlet of the cavity, a portion of the external wall of the nozzle intermediate the ends thereof tapering toward the discharge end and cooperating with the tapered wall of the cavity to provide a gas-tight seal, and to accurately center the nozzle in the cavity, the entire external wall of the nozzle on the side of the seal opposite to the discharge end of the nozzle being spaced from the internal wall of the cavity to provide a clearance space. The cavity is also provided with locking and sealing means comprising a member engaging the internal wall of the cavity, bearing against the end of the mixing nozzle opposite to the discharge end, and urging the tapering walls together; the locking and sealing means and the mixing nozzle being adapted to be removed from and inserted in the cavity through the end of the cavity opposite to the outlet. Oxygen and acetylene are supplied through separate gas passage means opening into the cavity on each side of the seal.

Further, in accordance with the invention, there is provided a relatively short blowpipe attachment for connection with a handle having passages therein for fuel gas and combustion-supporting gas, the attachment comprising a mixer, including an injector, for fuel gas and combustion-supporting gas. Means comprising passages in the attachment are provided for conveying the fuel gas and combustion-supporting gas to the mixer. The discharge end of the mixer is connected to a blowpipe head by a greatly elongated mixture conduit having a conformation providing return bends abruptly reversing the direction of flow of the mixed gases whereby the distance traveled by the mixed gases is much greater than the distance between the mixer and the head, thereby providing increased resistance to flashbacks and improved gas mixing, without increasing materially the overall length of the handle and attachment when connected together. The attachment is joined to the handle by connecting means which secure the ends of the respective passages in gas-tight engagement.

One form of the invention is shown by way of illustration in the accompanying drawings, in which:

Fig. 1 is a broken longitudinal mid-section through a blowpipe attachment constructed in accordance with the invention;

Fig. 2 is a cross section taken on a line II—II of Fig. 1;

Fig. 3 is a broken longitudinal section showing the connection between the rear end of the attachment and the forward end of the blowpipe handle.

Figure 4:
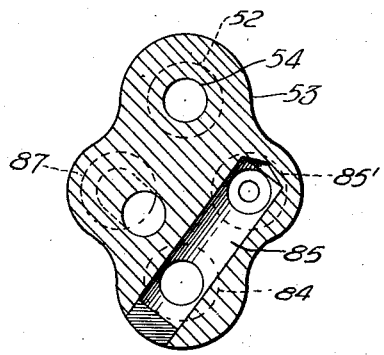
Fig. 4 is a sectional view taken along line 4—4 of Fig. 1.
Figure 5:
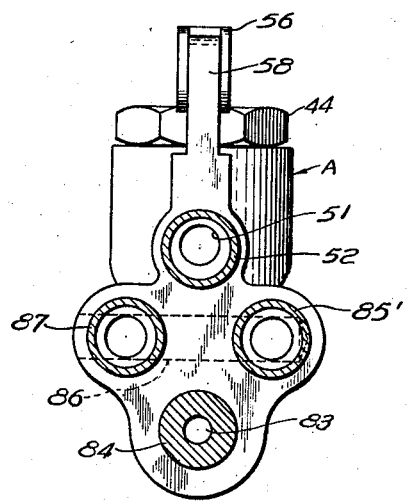
Fig. 5 is a sectional view taken along line 5—5 of Fig. 1.

In the embodiment which is illustrated in the drawings, there is shown the forward end of a blowpipe handle H, a blowpipe attachment A, and connecting means C for joining the attachment A to the handle H. It will be appreciated, of course, that the blowpipe attachment A is, in fact, the blowpipe itself.

The handle H comprises the usual hollow shell 10 which is attached at its forward end to a forward block 11. The front end of the forward block 11 is formed as an externally threaded nipple 12 having therein a concentric cavity 13, all parts being substantially coaxial with the major axis of the handle H.

The handle contains the usual oxygen conduit 14 and the usual acetylene conduit 15, both of which are fitted into the forward block 11. A duct 16 in the forward block 11 connects the forward end of the oxygen conduit with the rear center portion of the cavity 13 and a duct 17 connects the forward end of the acetylene conduit eccentrically with the rear end of the cavity 13. It is here noted that the words "oxygen" and "acetylene" are used in this specification for convenience, and are intended to denote respectively any appropriate cutting and combustion-supporting gas and any appropriate fuel gas.

The connecting means C comprises a nipple 18 having an external shoulder 19 near the rear end thereof, and a hollow nut 20 having an internal shoulder 21 at one end thereof adapted, respectively, to fit over and contact the external shoulder 19 on the nipple 18. The nipple 18 has a longitudinal axial passage 22 therethrough, which is carried rearwardly beyond the rest of the nipple by a rear projection 23, and which is carried forwardly of the rest of the nipple by a fore projection 24. A conical seat 25 is provided at the end of the projection 23, and a conical seat 26 is provided at the end of the projection 24, as will be more fully described at a subsequent point in this specification. A plurality of longitudinal passages 27, eccentric to the axial passage 22, extend through the nipple 18 in a direction substantially parallel to that of the axial passage 22; and a conical seating surface 28 is provided toward the rear end of the nipple 18 surrounding the plurality of longitudinal passages 27.

The hollow attaching nut 20 is placed over the nipple 18 from the forward end thereof and is moved until the internal shoulder 21 thereon contacts the external shoulder 19 on the nipple. In this position the hollow nut extends beyond the rearward seats 25 and 28, as best shown in Fig. 1. A retaining ring 29 is resiliently held in a groove 30 in the nipple immediately behind the hollow nut 20 and maintains the latter in the position which has just been described. Accordingly, the rear seating surfaces of the nipple 18 are always protected against damage.

The hollow nut 20 is internally threaded as at 31 so that it may be screwed upon the nipple end 12 of the forward block 11 of handle H. When the nipple 18 is so attached, the conical seats 25 and 28 contact corresponding seating surfaces 32 and 33 respectively in the cavity 13 of the forward block 11. Thus the axial passage 22 of the nipple extends in gas-tight continuation of the duct 16 in the forward block 11, and the plurality of passages 27 through the nipple extend in continuation of an annular chamber 34 which is formed in the cavity 13 when closed by the nipple end with the extension 23 extending therethrough.

The connecting nipple 18 is firmly secured to the attachment A by means of external threads 35 on the forward end of the former which may be screwed into an internally threaded primary gas inlet cavity 36 formed in the rear body of the latter. When the nipple is thus screwed into place, the forward conical seat 26 thereof comes tightly against a corresponding seating surface 37 which is formed at the inner end of the cavity 36. The seating surface 37 surrounds the end of an oxygen duct 38 which extends forwardly of the cavity in the rear body of the attachment A. The forward projection 24 on the nipple 18, extending through the cavity beyond the rest of the nipple, thus forms an annular chamber 36′ into which the plurality of passages 27 lead.

It is preferred to make the nipple 18 of sturdy construction and to provide heavy broad seats 25 and 26 surrounding the respective ends of the axial passage 22 to prevent swedging in the ends of the projections 23 and 24 when connection is made with the blowpipe handle and with the attachment. In order to facilitate this, the tubular walls of the extensions 23 and 24 are made very heavy. Furthermore, the broad sturdy seat 26 at the end of the extension 24 provides for a definite, sure stop in turning the nipple when it has been screwed home into position in the attachment. It is considered best to make this attachment permanent, and accordingly the threads 35 at the forward end of the nipple and the seat 26 are first tinned and the nipple is then sweated into the attachment.

It is also preferred to form the rear body of the attachment A of pressure-forged metal instead of a casting, in order that smaller sections may be used and lighter weight realized, together with ample strength. By using pressure-forged metal, the porosity sometimes found to exist in castings is also avoided. Finally, heating of the body for silver soldering and sweating in of parts does not affect a pressure forging as it does a casting.

The oxygen duct 38 in the rear body of the attachment A extends from the forward end of the axial passage 22 in the nipple 18 to a large cutting oxygen valve chamber 39 in which a valve 40 is normally held by a spring 41 against a flat ring seat 42 which may be composed of rubber or other resilient material. The valve 40 is urged by the spring 41 against the ring seat 42 in the direction in which the gas flows, and therefore tends to maintain a sure and leakproof seat. The central opening in the ring seat 42 is made as large as possible in order to give the valve a high capacity with respect to the transverse areas of the cutting gas passages. The high capacity of the ring seat 42 offers a minimum obstruction to the passage of cutting oxygen. Furthermore, the large size of the oxygen valve chamber affords a cushion of some magnitude in the cutting oxygen line. Both make it possible to use low pressure cutting and combustion-supporting gas in the blowpipe.

The ring seat 42 is held upon a shoulder 43 above the valve chamber 39 by means of a valve packing box 44 which is externally threaded and which screws into an internally threaded cavity 45 above the valve chamber 39. The valve 40 has a stem 46 which extends through the ring seat 42 and up through the valve packing box 44 beyond which it projects when the valve is closed. The valve packing box 44 has a cavity therein which is internally threaded and into which a threaded screw 47 is adapted to compress a packing 48. The under side of the threaded screw 47, and the base of the cavity into which it screws are preferably given the form of a gland in order to force the packing snugly against the valve stem 46. The valve packing box 44 has a chamber 49 formed in its inner end immediately above the valve 40 and a series of passages 49' extend radially therefrom to an annular chamber 50 formed by a reduced section of the valve packing box within the cavity 45. From the foregoing, it will be evident that the valve construction may be easily removed and replaced when necessary.

An oxygen delivery duct 51 extends through the body from the annular chamber 50 to the intake end of an oxygen delivery conduit 52, which connects at its forward end with a blowpipe head 53 forming part of the attachment A and having a duct 54 therein leading from the discharge end of the oxygen delivery conduit 52 to the inner end of a nozzle cavity 55 in the head 53.

A lever 56 is pivoted as at 57 to a projection 58 on the attachment A and a pair of notches 59 and 60 in the projection 58 coact with a spring-loaded ball latch 61 to hold the lever 56 either in position (as illustrated) for operating the valve 40 or in oppositely disposed position when the attachment is not to be used. Threaded through the lever 56 immediately above the valve stem 46 is an adjustable bearing screw 62 having a kerf at its top in order that it may be turned in the threads of the lever to depress or lift it with respect to the outer end of the valve stem 46. The bearing screw 62 may be provided with a fibre insert 63 to bind in the threads in order to maintain the screw in the position in which it is set. The bearing screw is adjusted so that when the lever 56 is in position ready to operate the valve 40 the screw will touch the end of the valve stem 46 without pressure.

Clearly, by depressing the lever 56, the valve stem 46 is moved toward the valve chamber 39 and the valve 40 is thereby opened. Oxygen will thereupon flow from the conduit 14 in the blowpipe handle H through the duct 16, through the axial passage 22 in the connecting nipple 18, through the oxygen duct 38 in the body of the blowpipe attachment A into the valve chamber 39, past the ring seat 42 into the chamber 49, through the radial passages 49' to the annular chamber 50, thence through the oxygen delivery duct 51 to the oxygen delivery conduit 52, thence through the duct 54 in the head 53, and thence to the nozzle cavity 55.

Combustion-supporting oxygen is carried from the oxygen duct 38 to an injector where it mixes with acetylene and is projected to the point of combustion. Thus a branch passage 64 connects with the oxygen duct 38 in the blowpipe attachment A and terminates in a preheating oxygen valve chamber 65, which may be closed by means of a valve 66 on a threaded valve stem 67. (See Fig. 2.) The valve stem 67 is operated by a handle 68. The valve chamber 65 is sealed by a packing 69 which is held in place by an internally threaded hollow nut 70 through which the valve stem 67 passes, all in the usual manner.

An internally threaded secondary gas inlet cavity 71 is formed in the rear body of the attachment A, preferably adjacent the cavity 36 into which the nipple 18 is screwed; and a mixer member such as the injector nozzle or mixing nozzle 72 in the form of a block is operably disposed therein, thereby providing a mixer for fuel gas and combustion-supporting gas. A passage 73 connects the valve chamber 65 with an annular chamber 74 which is formed between a reduced section of the injector nozzle 72 and the wall of the cavity 71. The chamber 74 is made large, and the entrance to and exit from the chamber are comparatively restricted. Accordingly, a cushion is provided in the combustion-supporting oxygen line and flashback resistance is thereby improved.

The injector nozzle 72 has a conical section 75 which seats in a conically formed interior portion of the cavity 71 and the entire external wall of the nozzle in the rear of the conical section 75 is spaced from the internal wall of the cavity to provide a clearance space. The injector nozzle is held in the cavity by a flat imperforate locking member, such as the screw 76, threaded into the cavity 71 and bearing upon the flanged rear end of the injector nozzle, which offers a broad bearing surface for coaction with the locking screw. The conical section 75 of the injector nozzle and the corresponding interior of the cavity 71 are accurately formed, as is the rear surface of the flanged nozzle end, and accordingly when the locking screw 76 is turned down against the injector nozzle, centering and correct positioning of the nozzle in the cavity are assured. The large seating surfaces between the injector nozzle and the cavity and between the flanged nozzle end and the locking screw prevent distortion of the nozzle and the rear body of the attachment when the locking screw is turned firmly into place. The carefully centered injector gives improved injector action and improved gas distribution, which in turn improves flashback resistance. The improved injector action makes it possible to use the apparatus without change for different fuel gas pressures.

Because of the perfect fit between the injector nozzle and the wall of the cavity, the nozzle will be held in place with such force that it is necessary to provide special means for withdrawing the nozzle. Accordingly the rear end of the nozzle has an axial internally threaded opening 77 therein into which an ordinary machine screw may be inserted in order to withdraw the injector nozzle. A plug 78, having a head which is adapted to be operated by a wrench, closes the cavity 71 behind the locking screw. A substantially radial duct 79 leads from the annular chamber 74 to an axial passage 80 extending through the injector nozzle, and having a restricted outlet orifice 80' at its forward end. Thus oxygen may be conducted from the oxygen duct 38 in the rear body of the attachment A to the discharge end of the injector nozzle 72.

The annular chamber 36' which surrounds the forward projection 23 of the connecting nipple 18 is connected, by an acetylene passage 81 in the rear body of the blowpipe attachment A, with the cavity 71 at a point ahead of the conical seating surface 75 on the injecting nozzle 72. An annular acetylene chamber 82 is provided at this point by reducing materially the section of the injecting nozzle to form an intermediate annular groove. Accordingly improved distribution is obtained around the injector nozzle, a cushion is provided in the acetylene line, and flashback resistance is improved. Furthermore, the relatively small size of the passage 81 and the small clearance between the nozzle 72 and the wall of the cavity 71 restricts the acetylene feed to and from the chamber, thereby improving the cushioning effect of the chamber and improving flashback resistance.

When the handle 68 is turned to open the valve 66 the oxygen flows from the oxygen duct 38 through the cross passage 64 into the valve chamber 65, and is then free to flow through the passage 73 to the annular chamber 74 surrounding the injecting nozzle 72. The oxygen then passes through the duct 79 to the axial passage 80 in the nozzle, whence it is projected, forcefully and accurately centered through the restricted outlet orifice 80' at the end of the nozzle 72, into a bore providing a mixing throat 83 which is formed in the rear body of the blowpipe attachment A in axial alignment with the cavity in the body. A suction is thereby created with respect to the chamber 82 whereby acetylene is drawn through the streamlined free flow passage of conical shape between the relatively long gradually-tapering conical portion of the nozzle and the forwardly converging conical surface of the cavity, into the mixing throat 83 where it mixes with the oxygen. The pressure of the acetylene in the conduit 15 in the blowpipe handle, together with the suction in the chamber 82, causes the acetylene to move into the annular chamber 34, thence through the eccentric passages 27 to the annular chamber 36', and thence through the passage 81 to the annular chamber 82 around the injector nozzle 72.

A greatly elongated mixture conduit connects the discharge end of the mixer with the blowpipe head. As here shown, a conduit 84 is fitted at one end into the rear body of the blowpipe attachment A at the end of the mixing throat 83, and extends forwardly to the blowpipe head 53, where its forward end is fastened. A cross passage 85 conveys the mixed oxygen and fuel gas through the blowpipe head to a second conduit 85' which conveys the combustible mixture back to the rear body of the blowpipe attachment A. Here a cross passage 86 carries the mixture to a third conduit 87 which passes forwardly to the blowpipe head 53, where its forward end opens into a duct 88 which communicates with that part 55' of the nozzle cavity which is designed to receive the combustible mixture.

This elongated mixture conduit, which has just been described, makes two complete reversals of direction, and provides a series of return bends by passing back and forth between the body and the head. The shape of the mixed gas passage in the mixture conduit, in addition to its length, also has an important bearing on the flashback resistance of the device. In the development of the invention, models in which the mixing tube was in one straight line, except for the turn at the base of the tip, were found to have not nearly the flashback resistance that the device of the present invention has, although in certain other respects they were similar. The four 90° changes in direction of the mixed gases in traversing the mixture conduit thus have a definite influence in increasing flashback resistance, although the scientific reason for this is not entirely clear. Injector action of the combustion-supporting gas upon the acetylene, combined with the cushioning action of the chambers 74 and 82 and the elongated mixture conduit, make it possible to employ this blowpipe efficiently with the acetylene at either low pressure or medium pressure.

In addition to increased flashback resistance, improved gas mixing is obtained by the conformation of the mixture conduit, providing return bends abruptly reversing the direction of flow of the mixed gases whereby the distance traveled by the mixed gases is much greater than the distance between the mixer and the head. These beneficial results are obtained without increasing materially the overall length of the handle and attachment when connected together, as compared to ordinary blowpipes, thereby making the assembled handle and attachment easy to balance and manipulate in service.

From the foregoing, the operation of the apparatus will be apparent. With the blowpipe attachment fastened to the blowpipe handle through the nipple 18 and the hollow nut 20, as illustrated in Fig. 3, the usual oxygen and acetylene valves in the handle are opened, the oxygen valve 66 in the attachment is opened and the combined oxygen and acetylene mixture issuing from the blowpipe is lighted. Adjustment of the oxygen valve 66 by means of the handle 68 will provide the desired heating flame.

Cutting oxygen may now be applied by depressing the lever 56 as long as a cutting operation is being performed. Upon releasing the lever 56, the cutting oxygen valve will automatically close and the spring-loaded ball latch in the lever will tend to hold it in inoperative position.

When a welding operation is to be performed, the hollow nut 20 may be unscrewed from the handle by means of a wrench and the attachment thereby removed. Replacing the original welding mixer and welding stem upon the handle will permit a welding operation to be carried out.

The form of the invention here described and illustrated in the accompanying drawings is presented merely to indicate how the invention may be applied. Other forms differing in detail but not in principle from that here shown and described will, of course, suggest themselves to those skilled in the art.

We claim:

1. In a blowpipe, a body having a cross passage therein, a mixer, including an injector, for fuel gas and combustion-supporting gas in said body, means for supplying the gases to said mixer, a blowpipe head having a cavity and a cross passage therein, a mixture conduit extending from the discharge end of said mixer to the cross passage in said head, a second mixture conduit extending from the cross passage in said head to the cross passage in said body, and a third mixture conduit extending from the cross passage in said body to the cavity in said head, said mixture conduits providing a continuous elongated passage having return bends connecting the discharge end of said mixer with said head for providing flashback resistance.

2. A blowpipe for use with fuel gas at different pressures comprising an injector having a relatively long gradually-tapering head portion for projecting a jet of combustion-supporting gas into a mixing throat, means providing a large chamber for fuel gas surrounding said injector and connected with the mixing throat around the forward end of said injector, said blowpipe also comprising a greatly elongated mixture conduit ahead of the throat, said mixture conduit having at least four 90° changes in direction for insuring thorough mixing of said gases and providing a blowpipe of high flashback resistance, the length of said conduit and the size of the chamber surrounding said injector providing a cushion in the gas line for improving flashback resistance.

3. A blowpipe for use with fuel gas at different pressures comprising an injector for projecting a jet of combustion-supporting gas into a mixing throat, means providing a large chamber for fuel gas surrounding said injector and connected with the mixing throat around the forward end of said injector, the fuel gas chamber having a comparatively restricted inlet and a comparatively restricted outlet, said blowpipe also comprising a greatly elongated mixture conduit having return bends, ahead of the throat, the length of said conduit, the size of the chamber surrounding said injector and the restricted inlet and outlet of the chamber providing a cushion in the gas line for improving flashback resistance.

4. A blowpipe for use with fuel gas at different pressures comprising an injector having a relatively long gradually-tapering head portion for projecting a jet of combustion-supporting gas into a mixing throat, means providing a large chamber for fuel gas surrounding said injector and connected with the mixing throat around the forward end of said injector, means providing a separate large chamber surrounding said injector for combustion-supporting gas, and means providing an axial passage through said injector connected to the combustion-supporting gas chamber, said blowpipe also comprising a greatly elongated mixture conduit having return bends ahead of the throat.

5. A blowpipe for use interchangeably with low or medium pressure acetylene comprising a handle having passages therein for two gases; and an attachment operably connectable to said handle; said attachment comprising a rear block having a passage therethrough for one gas, a nozzle head, a mixer for the two gases including an injector head having a relatively long gradually-tapering portion, a conduit connecting said rear block at the forward end of the gas passage therein with said nozzle head, and a multi-bend conduit connecting said rear block to said nozzle head in continuation of the discharge end of said mixer for increasing the flashback resistance of the blowpipe, said rear block having therein a branch passage extending from the first passage to said mixer and also a separate passage communicating with said handle and said mixer.

6. A blowpipe for use with fuel gas at different pressures comprising a body having a cavity and a bore in axial alignment, said bore providing a mixing throat, an injector for projecting a jet of combustion-supporting gas into said mixing throat, said injector comprising a relatively long gradually-tapering nozzle portion accurately spaced throughout from a forwardly converging wall of said cavity, and adapted to be firmly held in said cavity in said body, said injector having a large seating surface for contact with a portion of the wall of the cavity to center said injector accurately, means providing a large chamber for fuel gas surrounding said injector and connected with the mixing throat around the forward end of said injector, means providing a separate large chamber for combustion-supporting gas surrounding said injector, and an axial passage through said injector connected to the combustion-supporting gas chamber, said blowpipe also comprising a greatly elongated mixture conduit having return bends ahead of the throat.

7. A relatively short blowpipe comprising the combination with a blowpipe head, and a mixer for fuel and combustion-supporting gases, of a conduit for further mixing and conducting the mixed gases from said mixer to said head, said conduit having a conformation providing return bends abruptly reversing the direction of flow of the mixed gases, whereby the distance travelled by said mixed gases is greater than the distance between said mixer and said head, the flashback resistance of the blowpipe thereby being materially enhanced and gas mixing being improved while maintaining a relatively short distance between said mixer and said head.

8. A flashback-resistant blowpipe for use with gases flowing at different pressures, which comprises a mixing throat; a burner tip; a conduit for conducting a combustible gas mixture from said mixing throat to said burner tip, the said conduit having return bends providing abrupt changes in direction of gas flowing therethrough; an injector mounted in a cavity of the blowpipe and adapted to discharge a combustion-supporting gas into said throat and to inspirate combustible gas thereto, the said injector comprising a nozzle member having a conical end portion uniformly spaced from a wall of said cavity, a second conical portion in fluid-tight engagement with said wall, and an intermediate grooved portion forming with said wall a chamber; a relatively restricted annular passage connecting said chamber and said throat; a fluid passage within said nozzle member having a restriction; means for conducting a combustible gas to said chamber; and means for conducting a combustion-supporting gas to said last-named fluid passage.

9. In a blowpipe, the combination of a mixer for fuel gas and combustion-supporting gas, means for supplying such gases to said mixer, a blowpipe head, and an elongated mixture conduit connecting the discharge end of said mixer with said head for conducting the mixed gases to said head, said conduit having at least four 90° changes in direction between said mixer and said head for insuring thorough mixing of said gases and providing a blowpipe of high flashback resistance.

10. In a blowpipe, in combination, a mixer for fuel gas and combustion-supporting gas, means for supplying such gases to said mixer, a blowpipe head, and an elongated mixture conduit connecting the discharge end of said mixer with said head, said mixture conduit having at least two 180° return bends between said mixer and said head for insuring thorough mixing of said gases and providing a blowpipe of high flashback resistance.

11. A relatively short blowpipe attachment for connection with a handle having passages therein for fuel gas and combustion-supporting gas, said attachment comprising a mixer, including an injector, for fuel gas and combustion-supporting gas; means comprising passages in said attachment for conveying fuel gas and combustion-supporting gas to said mixer; a blowpipe head; a greatly elongated mixture conduit connecting the discharge end of said mixer with said head, said conduit having a conformation providing return bends abruptly reversing the direction of flow of the mixed gases whereby the distance traveled by said mixed gases is much greater than the distance between said mixer and said head, thereby providing increased resistance to flashbacks and improved gas mixing, without increasing materially the overall length of the handle and attachment when connected together; and connecting means for joining said attachment to said handle with the ends of the respective passages in gas-tight engagement.

12. A relatively short blowpipe attachment for connection with a handle having passages therein for two gases; a blowpipe head connected to said attachment; said attachment comprising a mixer including an injector head having a relatively long gradually-tapering portion; said attachment having a passage therethrough for one gas, a passage to said mixer for the other gas, and a branch passage extending from the first passage to said mixer; and a greatly elongated mixture conduit, said conduit being connected with the discharge end of said mixer and with the blowpipe head, and said conduit having a conformation providing return bends abruptly reversing the direction of flow of the mixed gases whereby the distance traveled by said mixed gases is much greater than the distance between said mixer and said head, thereby providing increased resistance to flashbacks and improved gas mixing, without increasing materially the overall length of the handle and attachment when connected together.

13. A blowpipe having a cavity; an outlet for a combustible gas mixture at one end of said cavity; the internal wall of said cavity tapering toward said outlet; a mixing nozzle in said cavity, said nozzle having a discharge end adjacent to said outlet; a portion of the external wall of said nozzle intermediate the ends thereof tapering toward said discharge end and cooperating with the tapered wall of said cavity to provide a gas-tight seal, and to accurately center said nozzle in said cavity, the entire external wall of said nozzle on the side of said seal opposite to the discharge end of said nozzle being spaced from the internal wall of said cavity to provide a clearance space; locking and sealing means in said cavity, said means comprising a member engaging the internal wall of said cavity, bearing against the end of said mixing nozzle opposite to said discharge end, and urging said tapering walls together, said locking and sealing means and said mixing nozzle being adapted to be removed from and inserted in said cavity through the end of said cavity opposite to said outlet; and separate gas-passage means opening into said cavity on each side of said seal.

WILGOT J. JACOBSSON.
SAMUEL R. OLDHAM.